(12) United States Patent
Li et al.

(10) Patent No.: US 9,258,292 B2
(45) Date of Patent: Feb. 9, 2016

(54) ADAPTING FEDERATED WEB IDENTITY PROTOCOLS

(71) Applicant: Futurewei Technologies, Inc., Plano, TX (US)

(72) Inventors: Li Li, Bridgewater, NJ (US); Tao Cai, Shenzhen (CN); Wu Chou, Basking Ridge, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 193 days.

(21) Appl. No.: 14/154,982

(22) Filed: Jan. 14, 2014

(65) Prior Publication Data

US 2014/0201820 A1    Jul. 17, 2014

Related U.S. Application Data

(60) Provisional application No. 61/752,254, filed on Jan. 14, 2013.

(51) Int. Cl.
   *G06F 7/04*    (2006.01)
   *G06F 15/16*   (2006.01)
   *G06F 17/30*   (2006.01)
   *H04L 29/06*   (2006.01)

(52) U.S. Cl.
   CPC .............. *H04L 63/08* (2013.01); *H04L 63/126* (2013.01)

(58) Field of Classification Search
   CPC ......... H04L 63/10; H04L 63/08; H04L 63/20; H04W 12/06; H04W 12/08
   USPC ............................................................ 726/4
   See application file for complete search history.

(56) References Cited

U.S. PATENT DOCUMENTS

| | | | | |
|---|---|---|---|---|
| 2005/0096012 | A1* | 5/2005 | Borella | H04L 12/14 455/411 |
| 2010/0125892 | A1* | 5/2010 | Tanizawa | H04L 63/08 726/2 |
| 2012/0102131 | A1* | 4/2012 | Lin | H04L 12/66 709/207 |
| 2012/0201361 | A1* | 8/2012 | Angel | H04M 3/42221 379/88.01 |
| 2012/0300698 | A1* | 11/2012 | Lindner | H04W 4/08 370/328 |
| 2012/0311686 | A1* | 12/2012 | Medina | H04L 63/0807 726/7 |

* cited by examiner

*Primary Examiner* — Ali Abyaneh
*Assistant Examiner* — Stephen Sanders
(74) *Attorney, Agent, or Firm* — Conley Rose, P.C.; Grant Rodolph; Brandt D. Howell

(57) ABSTRACT

A method of performing a Real-Time Communication in Web-browsers (RTCWEB) identity authentication based on an authentication of a non-RTCWEB compliant Identity Provider (IdP) server comprising receiving, by an RTCWEB IdP client, an RTCWEB identity authentication request from a user agent, creating a session resource with a Relying Party (RP) client, wherein the RP client guards the session resource, instructing the user agent to authenticate with the RP client by employing a non-RTCWEB identity protocol to access the session resource, receiving authentication results from the non-RTCWEB compliant IdP server via the RP client, and sending an RTCWEB authentication to the user agent via the session resource.

20 Claims, 7 Drawing Sheets

ADAPTING FEDERATED WEB IDENTITY PROTOCOLS

CROSS-REFERENCE TO RELATED APPLICATIONS

The present application claims priority to U.S. Provisional Patent Application 61/752,254 filed Jan. 14, 2013 by Li Li, et al., and entitled "A System and Method to Adapt Federated Web Identity Protocols," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Web based applications have been developed to support video and/or audio calls between user devices. For example, a local user may wish to call a remote user via a web browser. The user may employ a web based application with a user interface. The user may interact with the interface to determine that the remote user is available. The user may then make the call. The remote user may then accept or deny the call request. Various security protocols may be employed to assure the local user that the party appearing as the remote user is actually the remote user and not a malicious entity and vice versa. Real-Time Communication in Web-browsers (RTCWEB) may be a standardized protocol suite, which may support web based user to user interaction. However, RTCWEB may not be completely backwards compatible with legacy security devices as such security devices may not support all protocols required for full RTCWEB functionality.

SUMMARY

In one embodiment, the disclosure includes an apparatus comprising one or more receivers configured to receive an RTCWEB identity authentication request from a user agent, one or more transmitters configured to transmit messages to the user agent and an Identity Provider (IdP) server that supports a non-RTCWEB Identity protocol, a processor coupled to the receivers and the transmitters and configured to create a Relying Party (RP) client in a non-RTCWEB layer, wherein the RP client is configured to perform a non-RTCWEB authentication by authenticating the user agent with the IdP server via the transmitters and receivers using the non-RTCWEB protocol, and create an IdP client in an RTCWEB layer, wherein the IdP client is configured to communicate with the user agent via the transmitters using an RTCWEB protocol to instruct the user agent to communicate with the RP client by employing the non-RTCWEB protocol for user authentication, and provide an RTCWEB identity authentication to the user agent based on results of the RP client non-RTCWEB authentication.

In another embodiment, the disclosure includes a method of performing an RTCWEB authentication based on an authentication of a non-RTCWEB compliant IdP server comprising receiving, by an RTCWEB IdP client, an RTCWEB identity authentication request from a user agent, creating a session resource with a RP client, wherein the RP client guards the session resource, instructing the user agent to authenticate with the RP client by employing a non-RTCWEB protocol to access the session resource, receiving authentication results from the non-RTCWEB compliant IdP server via the RP client, and sending an RTCWEB authentication to the user agent via the session resource.

In another embodiment, the disclosure includes a method of obtaining an RTCWEB identity authentication from an Identity Adaptation Provider (IdAP) based on an authentication of a non-RTCWEB compliant IdP server comprising creating an RTCWEB proxy and a non-RTCWEB proxy based on instructions from an IdP client of an IdAP, transmitting an RTCWEB identity authentication request to the IdP client from the RTCWEB proxy, forwarding session data from the RTCWEB proxy to the non-RTCWEB proxy, transmitting a non-RTCWEB authentication request to a RP client of the IdAP for authentication with the non-RTCWEB compliant IdP server, wherein the non-RTCWEB authentication request is transmitted from the non-RTCWEB proxy, and wherein the non-RTCWEB authentication request comprises the session data, and receiving an RTCWEB identity authentication from the IdAP.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
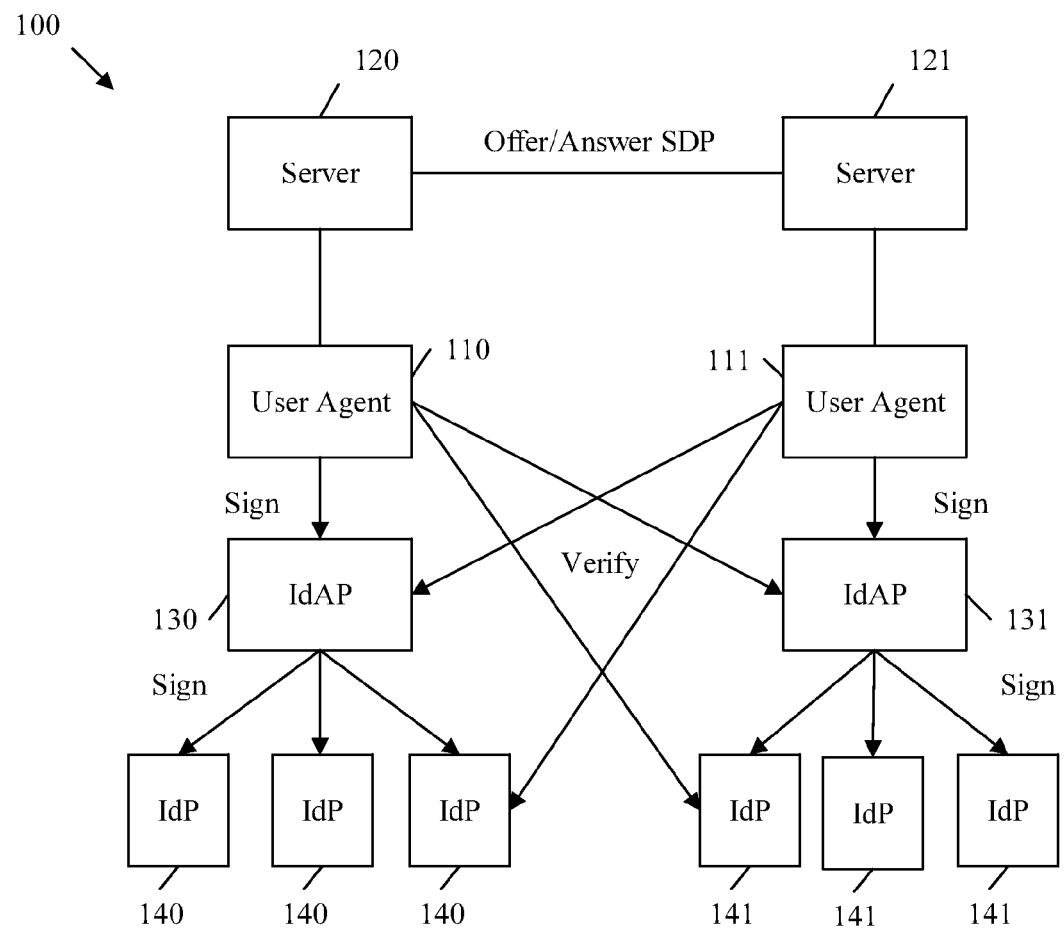
FIG. 1 is a schematic diagram of an embodiment of an RTCWEB network architecture employing an IdAP.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

RTCWEB may be a secure communication protocol suite as set forth in Internet Engineering Task Force (IETF) document draft-ietf-rtcweb-security-arch-07 and World Wide Web Consortium (W3C) document WebRTC 1.0: Real-time Communication Between Browsers W3C Working Draft 10, both of which are hereby incorporated by reference. RTCWEB, also known as WebRTC, may allow browser-to-browser communications such as voice calling, video chat, peer to peer (P2P) file sharing, audio calls, etc., without requiring web browser plugins. For example, RTCWEB may be a protocol suite that supports direct real-time media transfer between web browsers by employing Ecma International Scripting language (ECMAScript) based Application Programming Interfaces (APIs) in Web interface definition language (WebIDL). RTCWEB may be based on federated identity systems where user agents can authenticate themselves to each other through IdPs that may not be controlled by associated calling sites, for example OpenID, OAuth, and/or Mozilla Persona. However, RTCWEB may not interact seamlessly with all identity protocols. For example, RTCWEB may require that all IdPs sign an arbitrary string such as a Datagram Transport Layer Security (DTLS) fingerprint, to cryptographically bind Secure Real-time Transport Protocol (SRTP) and/or DTLS to a particular user identity. RTCWEB may also require that all IdPs be configured to verify signatures, even though some protocols, such as WebID, may not support such verification. RTCWEB may also require that all IdPs return a JavaScript module to encapsulate an associated protocol stack. However, some IdPs, such as Persona or OAuth version 2.0, may not support such a feature. RTCWEB may allow the use of Third-Party IdPs but may not describe how such IdPs interact with authoritative IdP to provide the associated authorization services.

Disclosed herein is a mechanism to allow a user agent (e.g. a web browser) to obtain an RTCWEB identity signature and/or RTCWEB identity verification from an IdP server that does not support RTCWEB protocols. The user agent may login to an IdAP. The IdAP may comprise an IdP client for communicating with the user agent using RTCWEB protocols and an RP client for communicating with the user agent in a non-RTCWEB protocol supported by the IdP server. The IdAP may instruct the user agent to create an RTCWEB proxy for RTCWEB communications with the IdP client and a non-RTCWEB proxy for communications with the RP client. The IdP client may receive RTCWEB compliant identifying data from the RTCWEB proxy. The IdP client may then create a session with the RP to hold the identifying data. The RP client may guard access to the data in the session. The RP client may communicate with the non-RTCWEB proxy and/or the IdP server in a protocol native to the IdP server. The RP client may facilitate authentication of the user agent by the IdP server, but may not receive user secrets (e.g. passwords) associated with the IdP server. The RP client may receive the results of the IdP server authentication and forward them to the IdP client via the session. The IdP client may then issue an RTCWEB compliant identity signature and/or verification to the session for transmittal to the user agent. The RTCWEB identity signature may be used by a local user agent for security purposes when making an RTCWEB based call to a remote user agent. The remote user agent may then verify the RTCWEB identity signature of the local user agent via the IdAP, the IdP server, or combinations thereof.

FIG. 1 is a schematic diagram of an embodiment of an RTCWEB network 100 architecture employing an IdAP. Network 100 may comprise user agent 110, user agent 111, server 120, server 121, IdAP 130, IdAP 131, IdPs 140 and/or IdPs 141. In an example embodiment, user agent 110 may wish to make an RTCWEB based call to user agent 111, for example a video call, voice call, or other real time connection. User agent 110 may contact user agent 111 via servers 120 and/or 121 by transmitting a communications offer message, such as a session description Protocol (SDP) offer message. User agent 110 may employ IdAP 130 and/or IdPs 140 to obtain a signature to send to user agent 111 as part of the offer message. User agent 111 may receive the signature and verify the signature with IdAP 130 and/or IdPs 140 to ensure that the offer was sent by user agent 110 and not some other malicious entity. User agent 111 may then obtain a signature from IdAP 131 and/or IdPs 141 and include the signature in an answer message, such as an SDP answer message. The user agent 111 may forward the answer to user agent 110 via servers 120 and/or 121. User agent 110 may then verify the signature in the answer with IdAP 131 and/or IdPs 141 to ensure the answer came from 111 and not some other malicious entity. User agents 110 and 111 may then have confidence that associated communications are being sent to/received from their intended source/destination. As such, IdPs 140 and/or 141 may vouch for the identity of user agents 110 and/or 111 respectively. RTCWEB may require the use of protocols that are not supported by IdPs 140 and/or 141. IdAPs 130 and/or 131 may act as adaptors, which may allow user agents 110 and/or 111, respectively, to employ RTCWEB while employing non-RTCWEB compliant IdPs 140 and/or 141.

User agents 110 and 111 may each be any device and/or software that may act as a source and/or destination of an RTCWEB based connection. For example, user agents 110 and 111 may comprise personal computers (PCs), smart phones, tablet PCs, web browsing software, etc. User agents 110 and/or 111 may communicate and/or call one another via servers 120 and/or 121. Servers 120 and/or 121 may be any hardware and/or software component configured to initiate, maintain, and/or host such an RTCWEB communication, for example a web server, data center component, file server, application server, communication server, etc. It should be noted that, while network 100 employs two servers, any number of servers may be used depending on network 100 implementation.

IdPs 140 and/or 141 may be any hardware and/or software component configured to issue identification/authentication information to identify a user agent 110 and/or 111 for security purposes. An IdP 140 and/or 141 may be, for example, web servers, data center components, application servers, communication servers, etc. For example, user agent 110 may send sign requests to IdPs 140, and IdPs 140 may issue identification/authentication information to user agent 110 via IdAP 130. IdPs 140 may then receive a verification message from user agent 111 comprising the identification/authentication information. IdPs 140 may verify that the identification/authentication information matches the identification/authentication information issued to user agent 110, and that the entity transmitting the identification/authentication information to user agent 111 is user agent 110 and not some other entity. IdPs 141 may perform a substantially similar function for user agent 111. IdPs 140 and/or 141 may not support RTCWEB. As such, IdPs 140 and/or 141 may not respond directly to a RTCWEB sign request. IdPs 140 and/or 141 may instead be configured for some other non-RTCWEB protocol and/or protocol suite. As such, IdPs 140 and/or 141 may be non-RTCWEB compliant. It should be noted that, while three IdPs 140 and/or 141 are employed in network 100, any number of IdPs may be used as needed for a particular embodiment.

IdAP 130 and/or 131 may be any hardware and/or software component configured to support RTCWEB security authentication via a non-RTCWEB compliant IdP such as IdPs 140 and/or 141. An IdAP 130 and/or 131 may be, for example, web servers, data center components, application servers, communication servers, hardware adaptors connected to an IdP, etc. IdAPs 130 and/or 131 may comprise functionality as discussed in greater detail herein below.

In an embodiment, user agent 110 and/or 111 may employ the components of network 100 to make an RTCWEB based call by employing a security handshake. In an embodiment, user agent 110 may initiate the call. User agent 110 may obtain a signature from IdPs 140 via IdAP as discussed below. User agent 110 may transmit an offer to user agent 111 via servers 120 and 121. The offer may comprise the signature from IdPs 140. User agent 111 may verify the signature from the offer via IdAP 130 and/or IdPs 140. User agent 111 may then obtain a signature from IdPs 141 via IdAP 131, in a manner substantially similar to user agent 110 and IdPs 140. User agent 111 may then transmit the signature to user agent 110 as part of an answer. User agent 110 may then verify the signature with IdAP 131 and/or IdPs 141. User agents 110 and 111 may then communication directly and/or via servers 120 and/or 121.

Figure 2:
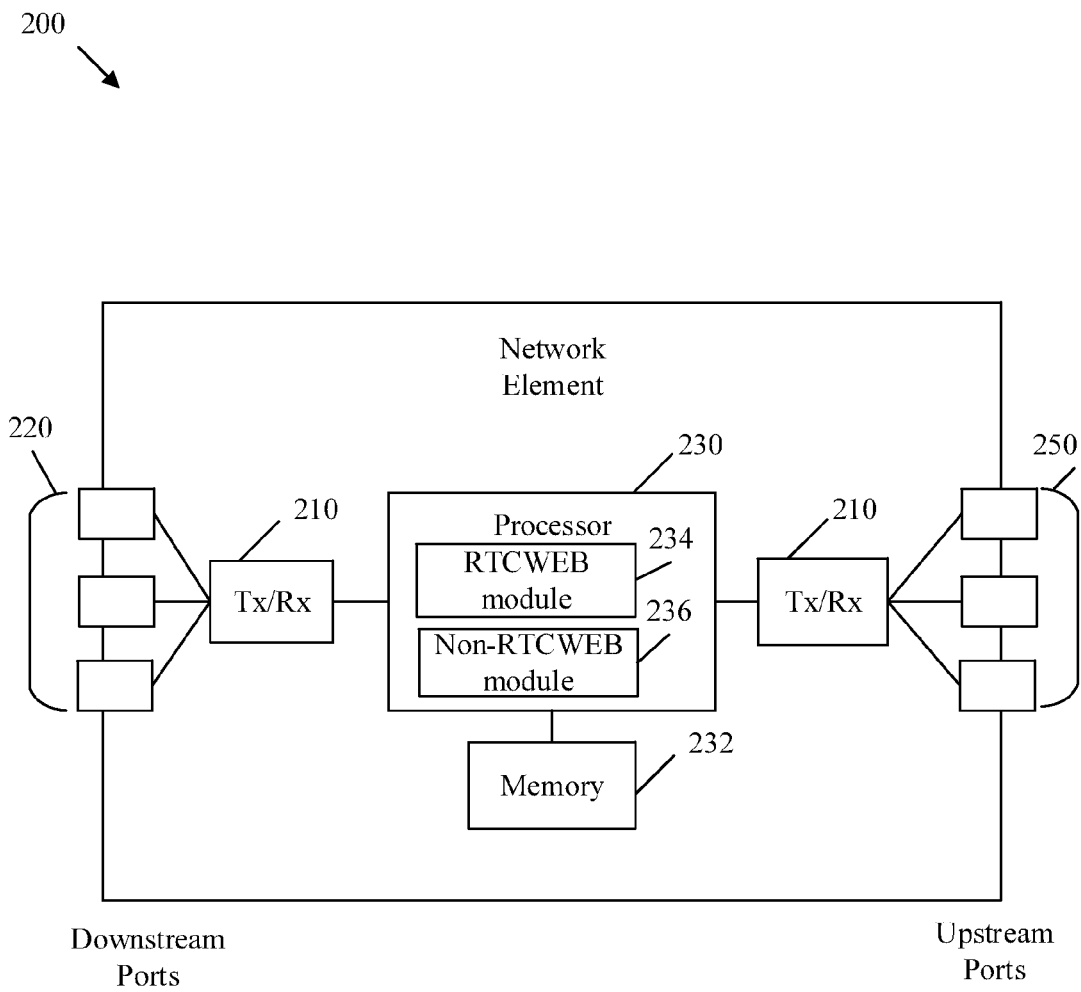
FIG. 2 is a schematic diagram of an embodiment of a Network Element (NE) within an RTCWEB network architecture.

FIG. 2 is a schematic diagram of an embodiment of 200 within an RTCWEB architecture, such as an IdAP 130, IdAP 131, user agent 110, and/or user agent 111. NE 200 may be configured to implement an RTCWEB protocol layer and a non-RTCWEB protocol layer to support RTCWEB functionality with an IdP that is non-RTCWEB compliant. NE 200 may be implemented in a single node or the functionality of NE 200 may be implemented in a plurality of nodes. In some embodiments, NE 200 may also act as other node(s) in network 100, such as server 120, server 121, IdPs 140, and/or IdPs 141 (e.g. an NE acting as an IdP may comprise Non-RTCWEB module 236 and may not comprise RTCWEB module 234). One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 200. For instance, the features/methods in the disclosure may be implemented using hardware, firmware, and/or software installed to run on hardware. The NE 200 may be any device that transports frames through a network, e.g., a switch, router, bridge, server, a client, etc. As shown in FIG. 2, the NE 200 may comprise transceivers (Tx/Rx) 210, which may be transmitters, receivers, or combinations thereof. A Tx/Rx 210 may be coupled to a plurality of downstream ports 220 (e.g. downstream interfaces) for transmitting and/or receiving frames from other nodes and a Tx/Rx 210 coupled to a plurality of upstream ports 250 (e.g. upstream interfaces) for transmitting and/or receiving frames from other nodes, respectively. A processor 230 may be coupled to the Tx/Rxs 210 to process the frames and/or determine which nodes to send frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise an RTCWEB module 234, which may communicate with other nodes using RTCWEB protocols and may operate in an RTCWEB protocol layer. Processor 230 may also comprise a non-RTCWEB module 236, which may communicate with other nodes using non-RTCWEB protocols and may operate in a non-RTCWEB layer. In an alternative embodiment, the RTCWEB module 234 and/or non-RTCWEB module 236 may be implemented as instructions stored in memory 232, which may be executed by processor 230, or implemented in part in the processor 230 and in part in the memory 232. In another alternative embodiment, the RTCWEB module 234 and/or non-RTCWEB module 236 may be implemented on separate NEs. The downstream ports 220 and/or upstream ports 250 may contain electrical and/or optical transmitting and/or receiving components.

It is understood that by programming and/or loading executable instructions onto the NE 200, at least one of the processor 230, RTCWEB module 234, non-RTCWEB module 236, Tx/Rxs 210, memory 232, downstream ports 220, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
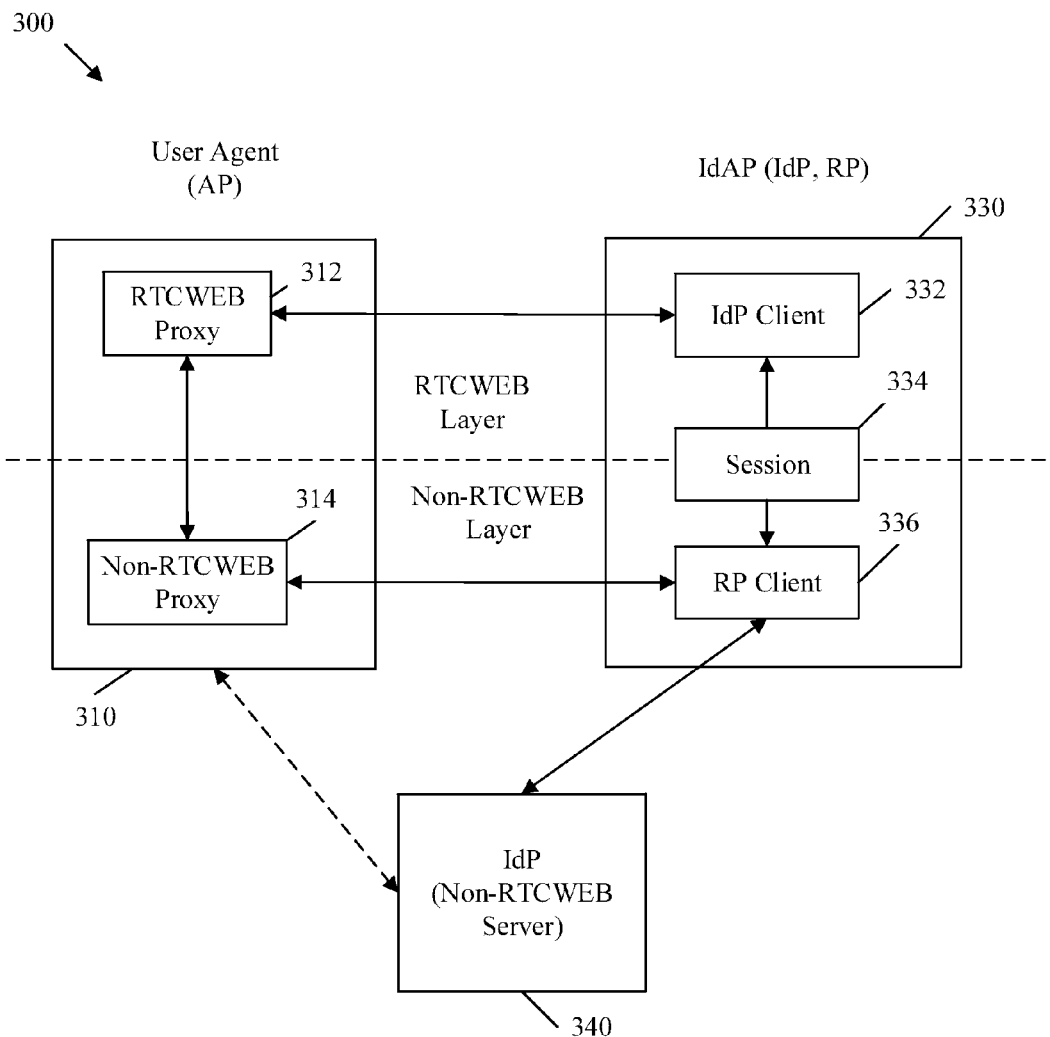
FIG. 3 is a schematic diagram of an embodiment of an IdAP architecture.

FIG. 3 is a schematic diagram of an embodiment of an IdAP network 300 architecture. Network 300 may comprise a user agent 310, an IdAP 330, and an IdP 340, which may be substantially similar to user agents 110 and/or 111, IdAP 130 and/or 131, and IdP 140 and/or 141, respectively. User agent 310 may act as an authenticating party (AP), where an AP may be an entity that requests to be authenticated. User agent 310 may comprise an RTCWEB proxy 312, which may operate in an RTCWEB layer, and a Non-RTCWEB proxy 314, which may operate in a Non-RTCWEB layer. RTCWEB layer components may not communicate directly with non-RTCWEB layer components unless otherwise specified. RTCWEB proxy 312 may communicate directly with Non-RTCWEB proxy 314 and vice versa. RTCWEB proxy 312 and Non-RTCWEB proxy 314 may be software components, such as Javascript modules executed on a processor, and may be created and managed by an RTCWEB compliant web browser. RTCWEB proxy 312 may communicate across the RTCWEB layer using RTCWEB protocols. Non-RTCWEB proxy 314 may be configured to communicate across the non-RTCWEB layer by employing one or more protocols that may be understood by IdP 340, such as (e.g. OpenID, OAuth2.0, Persona, WebID, etc.)

IdAP 330 may act as both an IdP and a Relying Party (RP). IdAP 330 may be configured to act as a IdP by receiving RTCWEB sign requests from user agent 310 and issuing RTCWEB signatures. IdAP 330 may be configured to act as an RP by relying on IdP 340 to provide authentication credentials for the user agent 310. IdAP 330 may comprise an IdP client 332, which may operate in the RTCWEB layer, and an RP client 336, which may operate in the non-RTCWEB layer. The IdP client 332 may create a session 334 with the RP client 336, or vice versa. Session 334 may contain authentication information relevant to the user agent 310 and may be guarded by the RP client 336.

The user agent 310 browser may request the IdAP 330 provide an RTCWEB based signature by logging into the IdAP 330. The IdAP 330 may transmit instructions to the user agent to create the RTCWEB proxy 312 and the Non-RTCWEB proxy 314. The RTCWEB proxy 312 may communicate with the IdP client 332 to request an RTCWEB signature. The IdP client 332 may create session 334 and store associated data in the session 334. The IdP client 332 may then direct the RTCWEB proxy 312 to seek further authentication in the non-RTCWEB layer via the non-RTCWEB proxy 314 and RP client 336. The non-RTCWEB proxy 314 may then communicate with the RP client 336 to request authentication using a non-RTCWEB protocol, for example a protocol employed by IdP 340. RP client 336 may communicate the Non-RTCWEB proxy 314 to indicate that the Non-RTCWEB proxy 314 should authenticate through IdP 340, for example by sending an authentication Uniform Resource Locator (URL). Non-RTCWEB Proxy 314 may authenticate with IdP 340. As such, the RP client 336 may not receive a user password or other data associated with the IdP 340. IdP 340 may return an authentication to RP client 336. Upon receiving the authentication results from the IdP 340, the RP client 336 may forward the authentication results to the IdP client 332 via the session 334. The IdP client 332 may then issue the RTCWEB signature to the session based on the IdP 340 authentication results received from the IdP 340 via the RP client 336. The IdAP 330 may then forward the RTCWEB signature to the user agent 310, via the session 334, the IdP client 332, the RP client 336, or combinations thereof. It should be noted that the dotted line between IdP 340 and user agent 310 may indicate a communication that may not be automated and may require user input such as a login.

Figure 4:
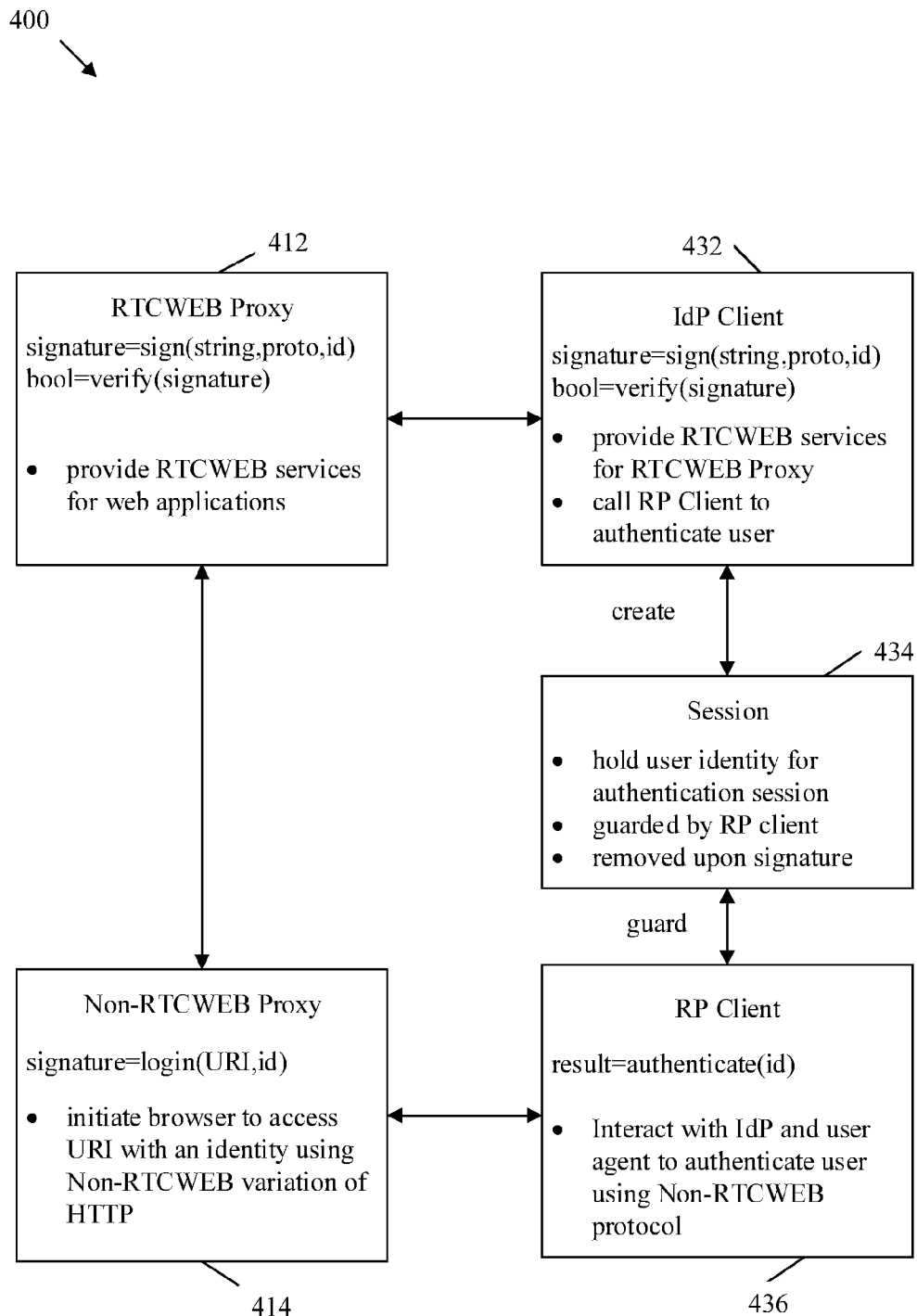
FIG. 4 is a schematic diagram of an embodiment of IdAP related network components.

FIG. 4 is a schematic diagram of an embodiment of IdAP related network components 400. Components 400 may comprise an RTCWEB proxy 412, a non-RTCWEB proxy 414, an IdP client 432, a session 434, and an RP client 436, which may be substantially similar to RTCWEB proxy 312, non-RTCWEB proxy 314, IdP client 332, session 334, and RP client 336. RTCWEB proxy 412 may operate on a user agent (e.g. browser) and may provide RTCWEB services for web applications. RTCWEB proxy 412 may request, receive, and employ a signature data object, which may be produced by the function call signature=sign(string,proto,id), where signature is a credential issued by an RTCWEB compliant IdP with a substantially unique string element acting as an identifying fingerprint for the user agent, an identity protocol element indicating a protocol employed for authenticating the user agent, and an identifier element that logically identifies the user agent (e.g. an email address, account name, etc.) RTCWEB proxy 412 may also request, receive, and employ a verify signature data object, which may result in a true or false value and may be produced by the function call bool=verify (signature) where the result of the signature function call is included as an argument to the verify object. RTCWEB Proxy 412 may transmit the verify data object to an IdP client 432 to request verification of a signature received from another user agent.

IdP client 432 may provide RTCWEB services for RTCWEB proxy 412, such as providing a signature upon request and verifying a signature. For example, an IdP client 432 may issue a signature for a local user agent and receive a request to verify the signature from a remote user agent. If the signature to be verified matches the signature issued to the local user agent, the value of verify signature is true. Otherwise the value is false and the signature may not be associated with the local user agent. IdP client 432 may also interact with RP client 436 via session 434 to obtain an authentication for a user agent from a non-RTCWEB compliant IdP server.

Non-RTCWEB proxy 414 may operate on a user agent (e.g. browser) and may interact with an RP client 436 in a protocol that is compatible with a non-RTCWEB compliant IdP server. Non-RTCWEB proxy 414 may also interact with the non-RTCWEB compliant IdP server. For example, the Non-RTCWEB proxy 414 may initiate user agent access to a Uniform Resource Identifier (URI) associated with the non-RTCWEB compliant IdP server using an identity of a type employed by the non-RTCWEB compliant IdP, for example a non-RTCWEB version of Hypertext Transfer Protocol (HTTP). In an embodiment, the Non-RTCWEB proxy 414 may cause a browser to access an HTTP link directed to the non-RTCWEB compliant IdP and submit a signature. The signature may be produced by function call signature=login (URI, id) where the login function authorizes a logical identifier of the user agent to access the URI of the non-RTCWEB compliant IdP server.

RP client 436 may interact with the non-RTCWEB proxy 414 and the non-RTCWEB compliant IdP server to obtain authentication of the user agent by using a non-RTCWEB protocol employed by the IdP server. The RP client 436 may rely on the authentication results of the IdP server. The results may be received from the IdP server by the function call result=authenticate(id) where the authenticate function checks the logical identifier of the user agent and indicates whether the authentication is successful.

Session 434 may be a data object created by the IdP client 432 to allow communication between the RTCWEB protocol layer and the non-RTCWEB protocol layer. The session may hold user identity (e.g. fingerprint, protocol, and/or id) for the duration of the authentication process. Session 434 may be guarded by the RP client 436 and may only be accessed through successful authentication by the RP client (e.g. as received by the non-RTCWEB compliant IdP server). Session 434 may receive the RTCWEB signature from IdP client 432 after the RP client 436 indicates successful authentication at the non-RTCWEB layer. Session 434 may be created at the start of the signature request process and deleted once the signature is transmitted to the user agent.

It should be noted that RTCWEB proxy 412, non-RTCWEB proxy 414, IdP client 432, session 434, and RP client 436 may all be configured to not receive a user password or other secret information associated with the non-RTCWEB compliant IdP server. Such information may be input into a web browser and received by the IdP server. Network components 400 may direct the browser to the IdP server and employ the authentication result of the IdP server without receiving the associated password to further protect a user's secrets. RTCWEB proxy 412 and/or IdP client 432 may receive and/or employ a password or other user secret information associated with the IdAP to allow the user to login to the IdAP. In such an embodiment, the user may employ two separate passwords to complete the RTCWEB authentication process.

Figure 5A:
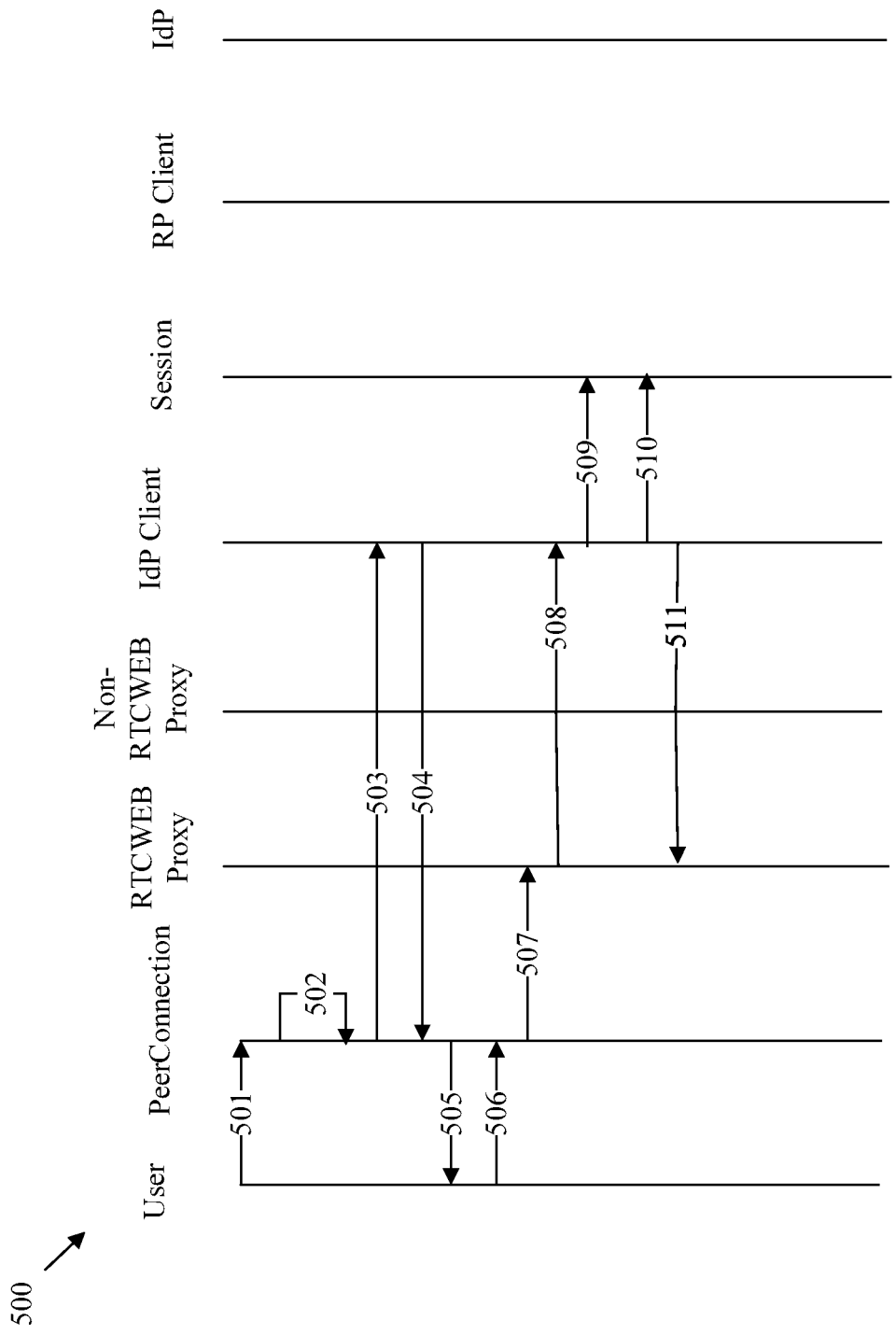
FIGS. 5A-5B are a protocol diagram of an embodiment of a method of issuing an RTCWEB based signature with an IdAP.
Figure 5B:
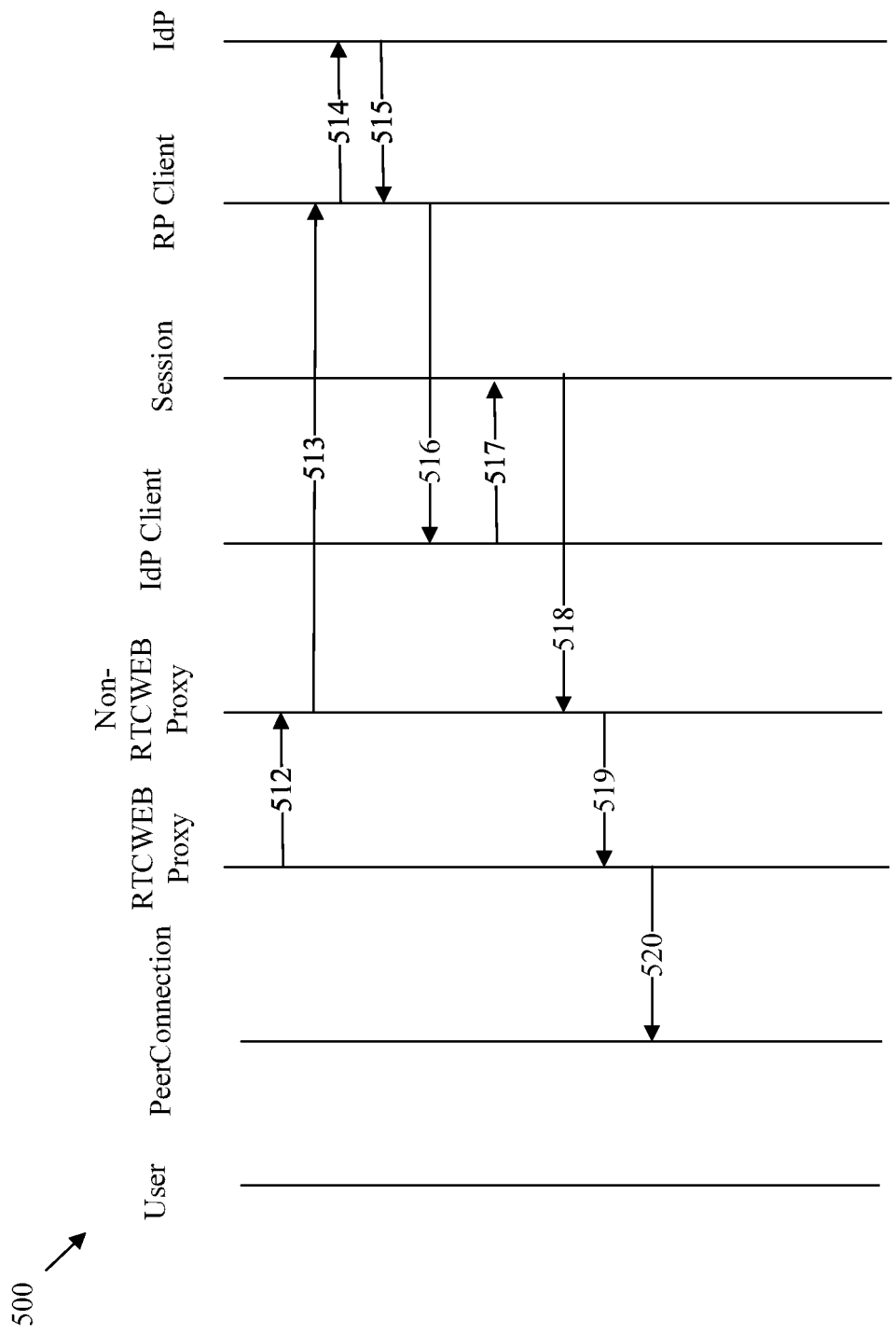

FIGS. 5A-5B are a protocol diagram of an embodiment of a method 500 of issuing an RTCWEB based signature with an IdAP. Method 500 may be implemented by receiving user interactions at a user agent (e.g. browser). The user agent (e.g. user agent 110 and/or 111) may comprise a PeerConnection object (e.g. an RTCPeerConnection object) for implementing calls to a remote user agent. The user agent may also comprise an RTCWEB proxy and a non-RTCWEB proxy, which may be substantially similar to RTCWEB proxy 312 and/or 412 and non-RTCWEB proxy 314 and/or 414, respectively. Method 500 may also be implemented on an IdAP that may comprise an IdP client, a session, and an RP client, which may be substantially similar to IdAP 130, 131, and/or 330, IdP client 332 and/or 432, session 334 and/or 434, and RP client 336 and/or 436, respectively. Method 500 may also be implemented on a non-RTCWEB compliant IdP server, which may be substantially similar to IdP server 140, 141, and/or 320.

At step 501, PeerConnection object may receive a request from a user to call a remote user agent. At step 502, the PeerConnection may create a fingerprint (e.g. a DTLS fingerprint) and bind the fingerprint to a user id. At step 503, the PeerConnection may transmit a HTTP get request to the IdAP to obtain a URI indicating the login page for the IdAP. The get request may be received by the IdP client. At step 504, the IdP client may transmit the login page to the PeerConnection along with instructions to create the RTCWEB proxy and the non-RTCWEB proxy. The PeerConnection may create the proxies and display the IdAP login page to the user at step 505.

At step 506, the PeerConnection may receive IdAP login data from the user and/or from another user agent function. The login data may comprise a selected authentication protocol (e.g. a protocol that may be employed by IdP) and a user identifier. At step 507, the PeerConnection may transmit a signature request (also known as a sign request) to the RTCWEB proxy. The signature request may be a JavaScript Object Notation (JSON) signature request and may comprise the fingerprint, the authentication protocol, and the user identity. At step 508, the RTCWEB proxy may transmit a post message to the IdP client that comprises the fingerprint, the authentication protocol, and the user identity. At step 509, the IdP client may create a session to hold the fingerprint and the user identity as data elements. At step 510, the IdP client may guard the session by setting a session data to a value associated with the authentication protocol selected by the user and granting access to the session to the RP client. The RP client may act as a guard for the session by allowing access to the session upon authentication by the IdP server. At step 511, the IdP client may transmit data identifying the session to the RTCWEB proxy.

At step 512, the RTCWEB proxy forwards a login request to the non-RTCWEB proxy. The login request may be a JSON login request and may indicate the session data and the user identifier. At step 513, the non-RTCWEB proxy may transmit a get request to the RP client. The get request may be transmitted in a non-RTCWEB protocol employed by the IdP server and may comprise the session data and the user identifier. At step 514, the RP client may authenticate the user agent with the IdP server. It should be noted that additional user interaction may be needed between the user and the IdP server if the RP client does not receive the user's IdP server password. For example, the RP client may transmit to the user a login page for the IdP server and invite the user to login. At step 515, the RP client may receive the results of the authentication, for example a successful authentication. At step 516, the RP client may transmit the authentication results to the IdP client (e.g. via the session). At step 517, the IdP client may issue an RTCWEB signature to the session, where the signature may comprise the fingerprint and the user identifier as elements. At step 518, the session may transmit the signature to the non-RTCWEB proxy. At step 519, the non-RTCWEB proxy may forward the signature to the RTCWEB proxy. At step, 520, the non-RTCWEB proxy may forward the signature to the PeerConnection to be included in a call to a remote user, such as an offer SDP message and/or an answer message as discussed with respect to network 100.

It should be noted that in alternate embodiments, the session may transmit the signature directly to the RTCWEB proxy and/or directly to the PeerConnection. In other alternate embodiments, the IdP client may instead transmit the signature directly to the RTCWEB proxy and/or directly to the PeerConnection without passing through the session.

Figure 6:
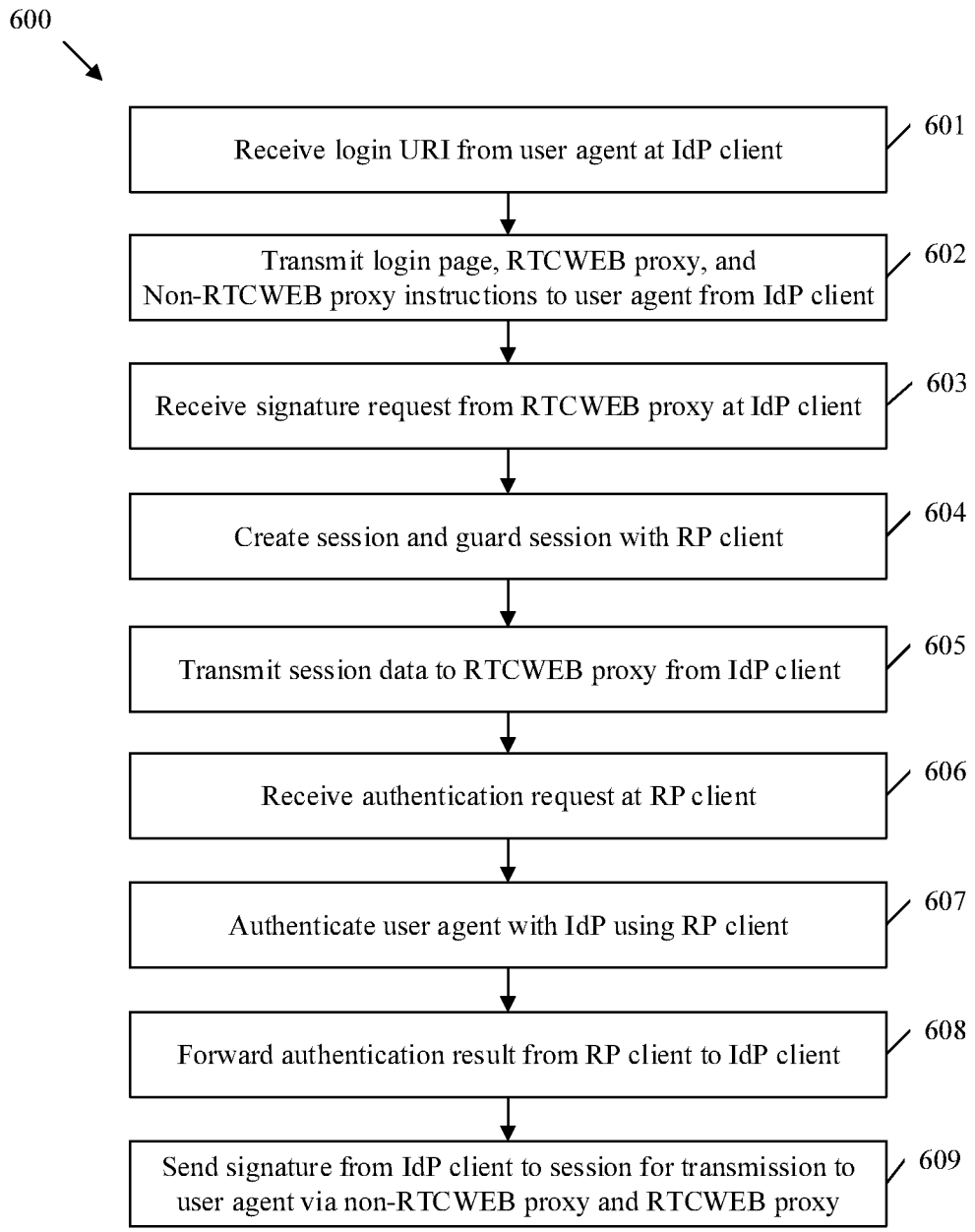
FIG. 6 is a flow chart of another embodiment of a method of issuing an RTCWEB based signature with an IdAP.

FIG. 6 is a flow chart of another embodiment of a method 600 of issuing an RTCWEB based signature with an IdAP, such as IdAP 130, 131, and/or 330. At step 601, a login URI may be received from a user agent. The IdP client may intercept the login. At step 602, the IdP client may transmit the login page, an RTCWEB proxy instructions, and/or a non-RTCWEB proxy instructions to the user agent. At step 603, the IdP client may receive a signature request from the RTCWEB proxy. At step 604, the IdP client may create a session with an RP client to store user identifying data and set the session to be guarded by the RP client. At step 605, the IdP client may transmit session data to the RTCWEB proxy. At step 606, the RP client may receive an authentication request in a non-RTCWEB protocol. At step 607, the RP client may authenticate the user agent with an IdP server by employing the non-RTCWEB protocol. At step 608, the RP client may receive authentication results from the IdP server and forward the results to the IdP client via the session. At step 609, the IdP client may transmit a signature to the session for transmission to the user agent via the non-RTCWEB proxy and the RTCWEB proxy.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    one or more receivers configured to receive a Real-Time Communication in Web-browsers (RTCWEB) identity authentication request from a user agent;
    one or more transmitters configured to transmit messages to the user agent and an Identity Provider (IdP) server that supports a non-RTCWEB identity protocol; and
    a processor coupled to the receivers and the transmitters and configured to:
        create a Relying Party (RP) client in a non-RTCWEB layer, wherein the RP client is configured to perform a non-RTCWEB authentication by authenticating the user agent with the IdP server via the transmitters and the receivers using the non-RTCWEB identity protocol; and
        create an IdP client in an RTCWEB layer, wherein the IdP client is configured to:
            communicate with the user agent via the transmitters using an RTCWEB protocol to instruct the user agent to communicate with the RP client by employing the non-RTCWEB identity protocol for user authentication; and
            provide an RTCWEB signature to the user agent based on results of the RP client non-RTCWEB authentication.

2. The apparatus of claim 1, wherein the IdP client is not configured to communicate directly with components in the non-RTCWEB layer, wherein the RP client is not configured to communicate directly with components in the RTCWEB layer, and wherein the processor is further configured to create a session resource to communicate with the IdP client and the RP client.

3. The apparatus of claim 1, wherein instructing the user agent to communicate with the RP client comprises transmitting executable code to the user agent in the RTCWEB layer to direct the user agent to create an RTCWEB proxy for RTCWEB layer communication and a non-RTCWEB proxy for non-RTCWEB layer communication.

4. The apparatus of claim 3, wherein the transmitted executable code further directs the RTCWEB proxy to send an RTCWEB signature request to the RTCWEB client via the RTCWEB protocol.

5. The apparatus of claim 4, wherein the transmitted executable code further directs the non-RTCWEB proxy to communicate with the RP client in the non-RTCWEB identity protocol for RP client non-RTCWEB authentication.

6. The apparatus of claim 1, wherein the IdP client is further configured to:
    receive an RTCWEB signature request from the RTCWEB proxy via the receivers, wherein the RTCWEB signature request comprises fingerprint data, protocol data, and identity data;
    create a session resource with the RP client to maintain the fingerprint data and the identity data; and
    transmit session resource identifying data to the RTCWEB proxy via the transmitters.

7. The apparatus of claim 6, wherein the RP client is further configured to receive the session resource identifying data and the identity data from the non-RTCWEB proxy via the receivers, and wherein performing non-RTCWEB authentication comprises:
    authenticating the user agent with the IdP server via the transmitters and receiver using the non-RTCWEB identity protocol; and
    indicating IdP server authentication results to the IdP client via the session resource.

8. The apparatus of claim 1, wherein the IdP client provides the RTCWEB signature to the user agent without receiving a user agent password associated with the IdP server.

9. A method of performing a Real-Time Communication in Web-browsers (RTCWEB) authentication based on an authentication of a non-RTCWEB compliant Identity Provider (IdP) server comprising:
    receiving, by an RTCWEB IdP client, an RTCWEB identity authentication request from a user agent;
    creating a session resource with a Relying Party (RP) client, wherein the RP client guards the session resource;
    instructing the user agent to authenticate with the RP client by employing a non-RTCWEB identity protocol to access the session resource;
    receiving authentication results from the non-RTCWEB compliant IdP server via the RP client; and
    sending an RTCWEB authentication to the user agent via the session resource.

10. The method of claim 9, wherein the RTCWEB identity authentication request comprises a requested protocol, and wherein guarding the session resource comprises employing the requested protocol as a session data.

11. The method of claim 10, wherein the RTCWEB identity authentication request further comprises a fingerprint and an identity, and wherein creating the session comprises including the fingerprint and the identity as session data guarded by the session data.

12. The method of claim 11, further comprising in response to receiving the identity authentication request, forwarding the session data to the user agent.

13. The method of claim 11, wherein instructing the user agent to authenticate with the RP client comprises transmitting executable code to the user agent directing the user agent to create an RTCWEB proxy to communicate with the IdP client via an RTCWEB protocol.

14. The method of claim 13, wherein the executable code further directs the user agent to create a legacy proxy to transmit the session data and the identity to the RP client via the non-RTCWEB identity protocol.

15. The method of claim 14, wherein the executable code further directs the RTCWEB proxy to login to the non-RTCWEB proxy using the session data and the identity.

16. A method of obtaining a Real-Time Communication in Web-browsers (RTCWEB) identity authentication from an Identity Adaptation Provider (IdAP) based on an authentication of a non-RTCWEB compliant Identity Provider (IdP) server comprising:
   creating an RTCWEB proxy and a non-RTCWEB proxy based on instructions from an IdP client of an IdAP;
   transmitting an RTCWEB identity authentication request to the IdP client from the RTCWEB proxy;
   forwarding session data from the RTCWEB proxy to the non-RTCWEB proxy;
   transmitting a non-RTCWEB authentication request to a Relying Party (RP) client of the IdAP for authentication with the non-RTCWEB compliant IdP server, wherein the non-RTCWEB authentication request is transmitted from the non-RTCWEB proxy, and wherein the non-RTCWEB authentication request comprises the session data; and
   receiving an RTCWEB identity authentication from the IdAP.

17. The method of claim 16, further comprising receiving the session data from the IdP client via an RTCWEB protocol.

18. The method of claim 16, further comprising in response to transmitting the authentication request to the RP client, receiving instructions from the RP client, wherein the instructions from the RP client indicate a mechanism for transmitting authentication data to the non-RTCWEB compliant IdP server without providing the authentication data to the IdAP.

19. The method of claim 18, wherein a result of an authentication of the authentication data by the non-RTCWEB compliant IdP server is not received from the IdP.

20. The method of claim 16, wherein the RTCWEB proxy and the non-RTCWEB proxy are created by a web browser operating on a local user agent, and wherein the RTCWEB signature is employed to perform a call to a remote user agent via an RTCWEB based protocol.

* * * * *